US008979154B2

(12) United States Patent
Petronek

(10) Patent No.: US 8,979,154 B2
(45) Date of Patent: Mar. 17, 2015

(54) CLAMPING ATTACHMENT WITH REGENERATIVE HYDRAULIC CIRCUIT

(71) Applicant: Cascade Corporation, Fairview, OR (US)

(72) Inventor: David W. Petronek, Boring, OR (US)

(73) Assignee: Cascade Corporation, Fairview, OR (US)

( * ) Notice: Subject to any disclaimer, the term of this patent is extended or adjusted under 35 U.S.C. 154(b) by 22 days.

(21) Appl. No.: 13/919,699

(22) Filed: Jun. 17, 2013

(65) Prior Publication Data

US 2014/0312639 A1 Oct. 23, 2014

Related U.S. Application Data

(60) Provisional application No. 61/814,080, filed on Apr. 19, 2013.

(51) Int. Cl.

| | |
|---|---|
| ***B25J 15/02*** | (2006.01) |
| ***B66F 9/18*** | (2006.01) |
| ***B66F 9/22*** | (2006.01) |
| ***F15B 15/00*** | (2006.01) |

(52) U.S. Cl.

CPC . *B66F 9/183* (2013.01); *B66F 9/22* (2013.01); *F15B 15/00* (2013.01)

USPC .......................................................... 294/192

(58) Field of Classification Search

CPC ....................................................... B66F 9/183

USPC ............ 294/192, 207, 198; 414/621, 21, 636; 92/436, 420

See application file for complete search history.

(56) References Cited

U.S. PATENT DOCUMENTS

| | | | | |
|---|---|---|---|---|
| 3,990,594 | A * | 11/1976 | Olson et al. | 414/621 |
| 4,397,221 | A | 8/1983 | Friesen et al. | |
| 5,417,464 | A * | 5/1995 | Seaberg et al. | 294/206 |
| 5,682,955 | A | 11/1997 | Groth et al. | |
| 6,390,751 | B2 * | 5/2002 | Jordan et al. | 414/21 |
| 6,439,826 | B1 * | 8/2002 | Jordan et al. | 414/636 |
| 6,454,511 | B1 * | 9/2002 | Jordan et al. | 414/621 |
| 6,843,636 | B2 * | 1/2005 | Jordan et al. | 414/636 |
| 7,018,159 | B2 * | 3/2006 | Jordan et al. | 414/636 |
| 8,091,467 | B2 * | 1/2012 | Petronek | 91/517 |
| 2006/0073001 | A1 | 4/2006 | Chase | |
| 2009/0050413 | A1 | 2/2009 | Nilsson | |
| 2009/0272257 | A1 * | 11/2009 | Petronek | 91/446 |

FOREIGN PATENT DOCUMENTS

EP 1657031 A1 5/2006

OTHER PUBLICATIONS

International Search Report and Written Opinion, mailed Feb. 10, 2014, PCT International Application No. PCT/US2013/039397, filed May 3, 2013, Cascade Corporation, 14 pgs.

* cited by examiner

*Primary Examiner* — Saul Rodriguez
*Assistant Examiner* — Gabriela Puig
(74) *Attorney, Agent, or Firm* — Chernoff Vilhauer McClung & Stenzel, LLP

(57) ABSTRACT

A regenerative hydraulic circuit for a clamping attachment limits the clamping force applied to a clamped load.

10 Claims, 2 Drawing Sheets

CLAMPING ATTACHMENT WITH REGENERATIVE HYDRAULIC CIRCUIT

CROSS-REFERENCE TO RELATED APPLICATIONS

This application claims the benefit of U.S. Provisional Application No. 61/814,080, filed Apr. 19, 2013.

BACKGROUND OF THE INVENTION

The present invention relates to a load handling clamp for use with a forklift or other load handling vehicle and, more particularly, to a load handling clamp having a regenerative hydraulic circuit.

Clamp attachments are used on forklift trucks and other load handling vehicles to engage a variety of loads. For example, rolls of paper are commonly engaged and moved with hydraulically actuated paper roll clamps attached to forklift trucks. The forklift truck is maneuvered to locate the paper roll between a pair of clamp arms and when the roll is in the proper position one or more hydraulic actuators are activated to clamp the roll between contact pads at the foremost ends of the arms. Paper rolls commonly weigh in excess of 1000 kilograms (kg.) and the clamp must generate and maintain sufficient clamping force to provide the necessary friction between the contact pads and the paper roll to immobilize the load in the clamp. On the other hand, the clamping force must be controlled to avoid distorting the clamped load or damaging the surface of the load in contact with the clamp. Some lighter loads are particularly fragile and the clamping force must be limited to a fraction of the force that can normally be exerted by the clamp. Clamping force can be reduced by controls that reduce the hydraulic pressure in the actuator(s) but if the pressure is too low the clamp may operate slowly or not at all. The clamping force can also be reduced by reducing the dimensions of portions of the hydraulic actuator but it is expensive to design, manufacture and stock special hydraulic actuators and reducing the size of portions of an actuator may weaken it structurally making the actuator prone to damage during use.

What is desired, therefore, is a hydraulically actuated clamp with a substantially reduced clamping force but which includes few custom components, is structurally rugged and which operates quickly and reliably.

DETAILED DESCRIPTION OF PREFERRED EMBODIMENTS

Figure 1:
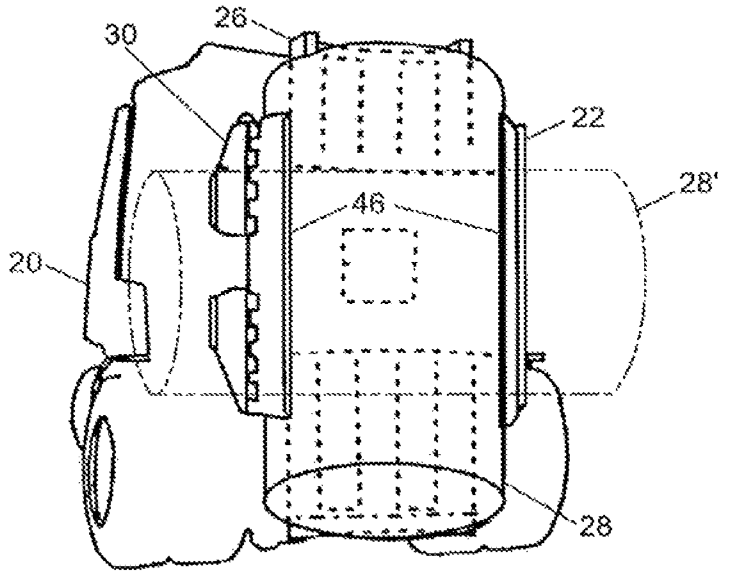
FIG. 1 is a perspective drawing of a forklift truck equipped with a clamping attachment.
Figure 2:
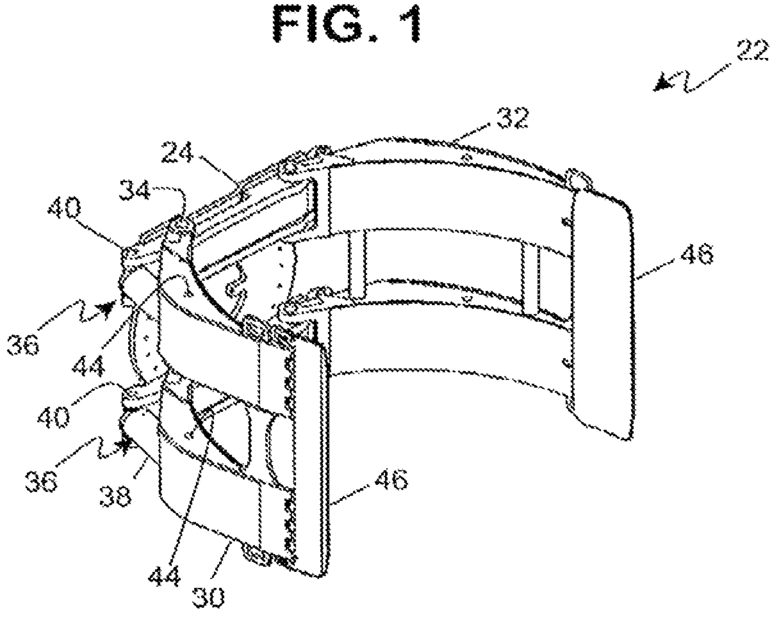
FIG. 2 is a perspective drawing of an exemplary paper roll clamping attachment.

Referring in detail to the drawings where similar parts are identified by like reference numerals, and, more particularly to FIGS. 1 and 2, clamping attachments are used on a variety of load handling vehicles, such as the exemplary forklift truck 20, to engage and clamp a load for handling, The exemplary clamping attachment 22 includes a frame 24 adapted for mounting on a forklift carriage which is, in turn, movable vertically in the forklift's tiltable mast assembly 26. The exemplary clamping attachment 22 is a paper roll clamp which is commonly used in handling cylindrical loads, such as rolls of paper or fiber. The frame 24 of the clamping attachment may include a rotator mechanism enabling the longitudinal axis of a cylindrical load 28 to be rotated from a vertical orientation as illustrated which is convenient for storing or transporting cylindrical loads, to a horizontal orientation 28' which is commonly preferred when winding or unwinding material from a roll for use in a printing press or other machine.

The clamping attachment 22 comprises generally, the frame 24, a movable first arm 30 and a second arm 32. The second arm 32 may be movable but is commonly fixed to or integral with the frame 24. The movable arm(s) 30 of the exemplary clamping attachment is pivotally attached to the frame 24 by a hinge comprising a pin 34 engageable with cooperating bores in portions of the arm and frame. The movable arm 30 is typically pivoted relative to the frame 24 by one or more actuators 36. The clamp arm actuator(s) is typically hydraulically activated and, while it may comprise a hydraulic motor with a rotating motor shaft and suitably connected to the frame and the movable arm; typically, the clamp arm of a clamping attachment is moved relative to the frame by a hydraulic linear actuator or cylinder. The hydraulic linear actuator(s) 36 typically comprise an actuator body 38 pivotally attached to either the frame or the clamp arm by a pin 40 and an actuator rod 42 pivotally attached to the other of the frame or clamp arm by a second pin 44. By extending or retracting the actuator rods 42 relative to the actuator bodies 38, the movable arm 30 of the exemplary clamping attachment 22 is pivoted to secure or release a load which is clamped between the contact pads 46 at the ends of the arms 30, 32 distal of the frame.

Paper rolls can be heavy, commonly weighing in excess of 1000 kilograms (kg.), and often shift during transportation or storage. As a consequence, a paper roll clamp is ruggedly built and has a powerful hydraulic system to provide and maintain sufficient clamping force to prevent the paper roll from slipping from the contact pads and to enable portions of the clamp arms to be inserted between closely packed or shifted rolls. On the other hand, full clamping force may be excessive for lighter loads and excessive clamping force can deform a clamped roll or damage its surface. Clamping force is typically controlled by limiting the fluid pressure applied to the hydraulic actuators which move the clamp's arm(s). However, reducing the hydraulic pressure to achieve a very low clamping force to protect a clamped load may result in too little pressure to move the clamp arm through its full range of motion or may substantially slow movement of the arm. A low clamping force can also be attained by reducing the area of the piston of a linear hydraulic actuator but a special small actuator assembly can be expensive to manufacture and might be subject to structural damage in the abusive environment that commonly characterizes paper roll handling. Moreover, if the hydraulic pressure or the ratio of the areas of the piston and rod are too low, there may be insufficient force to open the clamp fully. The inventor concluded that the clamping force of a clamping attachment could be limited to a fraction of the clamping force normally available without compromising structural integrity or operation of the attachment and at a lower cost by utilizing a hydraulic circuit incorporating regeneration to actuate the clamp arm.

Figure 3:
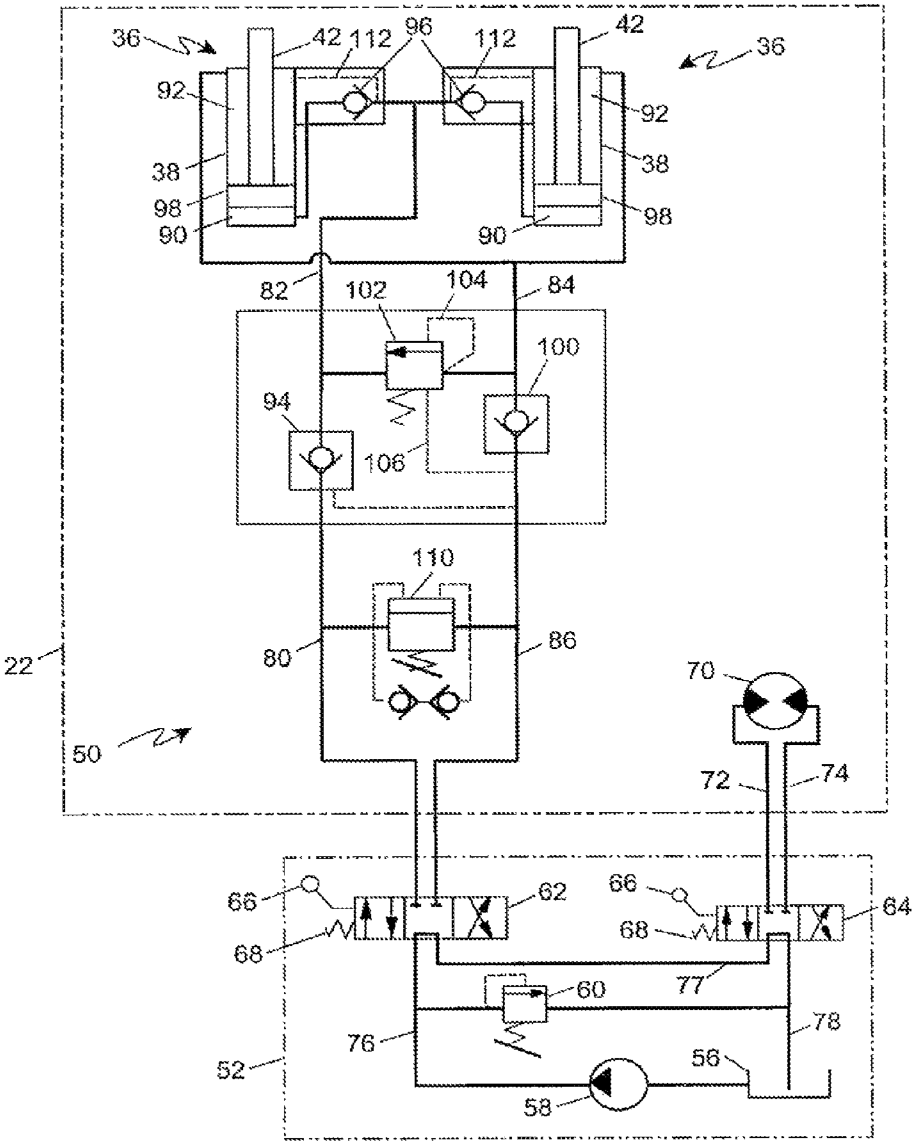
FIG. 3 is a schematic of a regenerative hydraulic circuit for a clamping attachment.

Referring also to FIG. 3, the hydraulic circuit 50 of the exemplary clamping attachment 22 is connected to the hydraulic system 52 of a lift truck or other load handling vehicle on which the clamping attachment is installed. The vehicle's hydraulic system 52 includes a reservoir 56 for hydraulic fluid and a pump 58, typically driven by an internal combustion engine or electric motor (not shown), to supply pressurized hydraulic fluid to the attachment and the other hydraulically operated equipment of the vehicle. A relief valve 60 limits the pressure in the vehicle's hydraulic circuit. A load handling vehicle's hydraulic circuit also typically includes plural valves to control the flow of pressurized fluid from the pump to the various actuators of the vehicle and, thereby, control the operation of the vehicle's hydraulically operated functions. A lift truck, for example, typically includes a lift/lower spool valve (not shown) that controls raising and lowering of a carriage in the lift truck's mast 26 and a tilt spool valve (not shown) which controls the forward and backward tilting of the mast.

The exemplary load handling vehicle hydraulic circuit 52 also includes plural auxiliary spool valves 62, 64 which are connectable to the hydraulic circuitry of an attachment, such as the clamping attachment 22, mountable on the vehicle. In the exemplary vehicle hydraulic circuit 52, the auxiliary spool valves 62, 64 are three position, open center valves with slidable spools which are manually operable 66 and centered by springs 68. However, the auxiliary spool valves could be operated by electric solenoids or other electrical or hydraulic actuators or remote control devices. A first auxiliary spool valve 64 is connected to an exemplary hydraulic motor 70 by a first conduit 72 and a second conduit 74. The hydraulic motor 70 may, for example, power rotation the exemplary clamping attachment 22 but could be any hydraulic actuator and arranged to operate another device. When the first auxiliary spool valve 64 is centered, as it is illustrated, the conduits 72, 74 connecting the valve to the motor 70 are blocked and the motor is inoperative. Pressurized fluid flowing from the pump 58, in conduit 76, passes through open passages in the second auxiliary spool valve 62, through the conduit 77 and the first auxiliary spool valve 64 and returns to the reservoir 56. When the spool of the first auxiliary spool valve 64 is shifted to the right from the illustrated position, fluid under pressure in conduits 76 and 77 will flow through the first spool valve into the conduit 72 and then to the motor 70 causing the motor to rotate in a first direction. Fluid exiting the motor returns through conduit 74 and thereafter to the reservoir 56 through conduit 78. When the spool of the first auxiliary spool valve 64 is shifted to the left, pressurized fluid is transmitted from conduits 76 and 77 to conduit 74 to cause the motor to rotate in the opposite direction. Fluid exhausted from the motor 70 passes through conduit 72 to conduit 78 and returns to the reservoir 56.

When the second auxiliary spool valve 62 is centered, conduits 80 and 86 are blocked and pressurized fluid from the pump flows through the open center passage in the valve and through conduit 77 to the first auxiliary spool valve 64.

When the second auxiliary spool valve 62 is shifted to the right from the position illustrated, pressurized fluid from the pump 58 is transmitted through the second auxiliary spool valve to conduit 80. Pressurized fluid is communicated through a check valve 94, conduit 82 and the load check valves 96 to the piston end volumes 90 of the actuators 36. The piston end volumes 90 defined by the interior volumes of the actuator bodies 38 and the ends of the pistons 98 distal of the cylinder rods 42 are connected in parallel by through conduit 82. Pressurized fluid in the piston end volumes 90 of the actuators 36 urges the pistons to move; expelling fluid from the rod end volumes 92 of the actuators and extending the cylinder rods. The rod end volumes 92 of the actuators 36 which are defined by portions of the interior volumes of the actuator bodies 38, the cylinder rods 42 and the exposed portion of the rod side of the pistons 98 are connected in parallel by conduit 84.

However, the flow of fluid from the rod end volumes 92 is blocked initially by the check valve 100 located between the conduit 84 and the conduit 86 and by a normally closed modulating valve 102 blocking flow between conduit 84 and conduit 82. The modulating valve 102 has a first pilot connection 104 to the conduit 84 and a second pilot connection 106 to the conduit 86. When the pressure in the rod end volumes 92, the conduit 84 and the pilot connection 104 increases and the pressure in the pilot connection 106 is low, the modulator valve will open enabling the fluid under pressure in the rod end volumes 92 of the actuators 36 to flow through the conduit 84 and combine with the fluid from the pump 58 flowing through conduit 82 and into the piston end volumes 90 of the actuators. The pressure in the conduit 86 will remain low when the second spool valve is shifted to the right because the conduit 86 is in fluid communication with the reservoir 56 and the check valve 100 blocks any flow fluid into the conduit from the rod end volumes of the actuators.

The speed at which the clamp arm 30 moves is substantially increased because the fluid transferred from the rod end volume 92 combines with the fluid supplied by the vehicle's pump to the piston end volumes 90 of the actuators 36. On the other hand, since the rod end volumes 92 and the piston end volumes 90 of the hydraulic actuators 36 are in fluid communication, the fluid pressure on both sides of the actuators' pistons equalizes and the effective areas of the pistons 98 of the hydraulic actuators are the areas of the cross-sections of the actuator rods 42. The maximum clamping force that can be exerted by an actuator is equal to product of the area of the actuator rod cross-section and the maximum pressure in the actuator which is a fraction of the force produced when the maximum pressure is applied to the full area of the piston. The maximum pressure in the clamping attachment's hydraulic circuit is controlled by the one of the vehicle's relief valve 60 and the clamping attachment's bidirectional relief valve 110 having the lowest relief pressure.

When the load is clamped and the operator releases the manual control 66 for the second auxiliary spool valve 62, the spring 68 returns the valve's spool to the center position blocking conduits 80 and 86. Clamping pressure is maintained in the piston end volumes 90 of the hydraulic actuators 36 by load check valves 96 which prevent the flow of fluid from the piston ends of the actuators. If a clamp arm should strike another object raising the pressure in the rod end volumes 92 of the actuators 36, the clamping force will be maintained because fluid flow out of the piston end volumes 90 and the rod end volumes 92 of the actuators would be blocked by check valve 94 even if a load check valve 96 and the modulating valve 102 should momentarily open in response to higher pressure in the rod end volume of the actuator and low pressure in conduit 86.

To open the clamp arms and release a clamped load, the operator shifts the second auxiliary spool valve 62 to the left, from the center position illustrated in FIG. 3. This will direct pressurized fluid from the pump 58 into conduit 86 and through the check valve 100. Pressure is applied to the fluid in conduit 84 but the modulator valve 102 will remain closed, blocking the flow of fluid into conduit 82 because the pressure at the second pilot connection 106 will be high. As pressure increases in the rod end volumes 92 of the actuators 36, the pilot operated load check valves 96 are forced open by their pilot operators in response to pressure in pilot connections 112. In addition, the pilot operator of the check valve 94 will be subjected to the pressure of the fluid in the rod end volumes of actuators and will open the check valve. With the load check valves and check valve 94 open, fluid will be expelled from the piston end volumes 90 of the actuators by movement of the pistons and flow back to the reservoir 56 through conduits 82, 80, 77 and 78. Since the full output of the pump flows into the rod end volumes of the actuators at pressures as high as the relief pressure, the actuators can move the open clamp arm through its full range with the same speed and force as they would with a non-regenerative hydraulic circuit.

The regenerative hydraulic circuit substantially increases the clamping speed while substantially reducing the clamping force of the arms of the clamping attachment to protect the load while maintaining the opening force and speed of the attachment and avoiding the need to design, manufacture and stock special hydraulic actuators.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

I claim:

1. A load handling clamp for a vehicle, said clamp comprising:

(a) a frame arranged for engagement with said vehicle;

(b) a clamp arm movably attached to said frame;

(c) an actuator arranged to move said clamp arm relative to said frame when fluid under pressure flows into a first actuator volume; and (d) a modulator valve arranged to enable fluid to flow from a second actuator volume to said first actuator volume when fluid in said first actuator volume and fluid in said second actuator volume is pressurized and said second actuator volume is not connected to a source of pressurized fluid.

2. The load handling clamp of claim 1 further comprising a load check valve arranged to prevent a flow of fluid from said first actuator volume unless said fluid in said second actuator volume is pressurized.

3. The load handling clamp of claim 1 further comprising:

(a) a second check valve blocking a flow of fluid from said first actuator volume unless said second actuator volume is in fluid communication with said source of pressurized fluid; and (b) a third check valve blocking fluid flow from said second actuator volume to a reservoir.

4. The load handling clamp of claim 3 further comprising a load check valve arranged to prevent a flow of fluid from said first actuator volume unless said fluid in said second actuator volume is pressurized.

5. The load handling clamp of claim 1 wherein said modulator valve blocks fluid flow between said second actuator volume and said first actuator volume when either one of said fluid pressure in said second actuator volume is less than said fluid pressure in said first actuator volume and said second actuator volume is in fluid communication with said source of pressurized fluid.

6. The load handling clamp of claim 5 further comprising a load check valve arranged to prevent a flow of fluid from said first actuator volume unless said fluid in said second actuator volume is pressurized.

7. The load handling clamp of claim 5 further comprising:

(a) a second check valve blocking a flow of fluid from said first actuator volume unless said second actuator volume is in fluid communication with said source of pressurized fluid; and (b) a third check valve blocking fluid flow from said second actuator volume to a reservoir.

8. The load handling clamp of claim 7 further comprising a load check valve arranged to prevent a flow of fluid from said first actuator volume unless said fluid in said second actuator volume is pressurized.

9. A load handling clamp for a vehicle, said clamp comprising:

(a) a frame arranged to engage said vehicle;

(b) a clamp arm movably attached to said frame;

(c) a linear hydraulic actuator comprising:

(i) an actuator body attached to one of said frame and said clamp arm and having an interior volume;

(ii) an actuator rod attached proximate a first end to the other of said frame and said clamp arm;

(iii) a piston having a first end affixed to said actuator rod and a second end, a first portion of said interior volume of said actuator body and said second end of said piston defining a piston end volume of said actuator and a second portion of said interior volume of said actuator body, a portion of said rod and a portion of said first end of said piston defining a rod end volume of said actuator, said piston and said actuator rod slidable in said actuator body to move said clamp arm relative to said frame when a fluid under pressure flows into one of said piston end volume and said rod end volume and fluid flows out of the respective other of said rod end volume and said piston end volume in response to movement of said piston in said interior volume of said actuator; and (d) a first check valve to block a flow of fluid from said rod end volume unless said rod end volume is connected to a source of pressurized fluid; and (e) a modulator valve arranged to enable a flow of fluid from said rod end volume to said piston end volume only if said rod end volume is not connected to a source of pressurized fluid and a pressure of said fluid in said rod end volume is at least equal to a pressure of said fluid in said piston end volume.

10. The load clamping attachment of claim 9 further comprising a load check valve arranged to block a flow of fluid from said piston end volume unless said rod end volume is connected to a source of pressurized fluid.

* * * * *